US012699048B2

(12) United States Patent
Sasayama

(10) Patent No.: US 12,699,048 B2
(45) Date of Patent: Aug. 4, 2026

(54) RAMAN-INFRARED SPECTROSCOPIC ANALYSIS MULTIFUNCTION MACHINE, AND MEASURING METHOD EMPLOYING Raman SPECTROSCOPY AND INFRARED SPECTROSCOPY

(71) Applicant: SHIMADZU CORPORATION, Kyoto (JP)

(72) Inventor: Tomoki Sasayama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 344 days.

(21) Appl. No.: 18/687,445

(22) PCT Filed: Apr. 27, 2022

(86) PCT No.: PCT/JP2022/019042
§ 371 (c)(1),
(2) Date: Aug. 5, 2024

(87) PCT Pub. No.: WO2023/032352
PCT Pub. Date: Mar. 9, 2023

(65) Prior Publication Data
US 2025/0130164 A1      Apr. 24, 2025

(30) Foreign Application Priority Data
Aug. 31, 2021    (JP) ................................. 2021-140776

(51) Int. Cl.
*G01N 21/3563*        (2014.01)
*G01N 21/65*          (2006.01)

(52) U.S. Cl.
CPC ......... *G01N 21/3563* (2013.01); *G01N 21/65* (2013.01); *G01N 2201/02* (2013.01)

(58) Field of Classification Search
CPC .............. G01N 21/3563; G01N 21/65; G01N 2201/02; G01N 2021/1734; G01J 3/0235;
(Continued)

(56) References Cited

U.S. PATENT DOCUMENTS 5,841,139 A      11/1998   Sostek et al.
2010/0093015 A1*   4/2010   Panza ................... G01N 21/65
                                                       435/29
(Continued)

FOREIGN PATENT DOCUMENTS

JP        2001-013095 A      1/2001
WO        2013/132734 A1     9/2013

OTHER PUBLICATIONS

Extended European Search Report dated Jun. 26, 2025 from the European Patent Office in Application No. 22863942.3.
(Continued)

*Primary Examiner* — Kiho Kim
(74) *Attorney, Agent, or Firm* — Sughrue Mion, PLLC

(57)            ABSTRACT
A Raman-infrared spectroscopy analysis combination device including: a light source; a plate for fixing a sample; a stage on which the plate is placed; an objective optical element for obtaining Raman light; an objective optical element for obtaining reflected infrared light; a Raman light detection system; an infrared light detection system; a driving unit for adjusting a positional relationship between a position of the plate and the objective optical elements; a switching unit that switches between the detection systems; and a control unit for controlling the driving unit, the switching unit and the optical imaging elements. At least one of the plate and the stage is provided with a marker for adjusting the positional relationship, and the control unit controls the driving unit to adjust the positional relationship
(Continued)

between the position of the plate and the objective optical elements based on a position of the marker.

13 Claims, 6 Drawing Sheets

(58) Field of Classification Search
CPC ... G01J 3/0289; G01J 3/42; G01J 3/44; G02B
21/18; G02B 21/361; G02B 21/362
See application file for complete search history.

(56) References Cited

U.S. PATENT DOCUMENTS

| | | | |
|---|---|---|---|
| 2014/0185927 A1 | 7/2014 | Kawabata et al. | |
| 2015/0085098 A1 | 3/2015 | Dowaki et al. | |
| 2017/0292908 A1 | 10/2017 | Wilk et al. | |

OTHER PUBLICATIONS

International Search Report for PCT/JP2022/019042, dated Jul. 26, 2022.
Written Opinion for PCT/JP2022/019042, dated Jul. 26, 2022.
Communication issued Oct. 1, 2024 in Japanese Application No. 2023-545079.

* cited by examiner

RAMAN-INFRARED SPECTROSCOPIC ANALYSIS MULTIFUNCTION MACHINE, AND MEASURING METHOD EMPLOYING Raman SPECTROSCOPY AND INFRARED SPECTROSCOPY

CROSS REFERENCE TO RELATED APPLICATIONS

This application is a National Stage of International Application No. PCT/JP2022/019042 filed Apr. 27, 2022, claiming priority based on Japanese Patent Application No. 2021-140776 filed Aug. 31, 2021.

TECHNICAL FIELD

The present invention relates to a Raman-infrared spectroscopy analysis combination device. More specifically, the present invention relates to an analysis combination device having Raman spectroscopy analysis and infrared spectroscopy analysis. The present invention also relates to an analysis method using infrared spectroscopy and Raman spectroscopy.

RELATED ART

Various methods for analyzing unknown substances are known, and by appropriately selecting an analysis means depending on substances to be analyzed, it becomes possible to analyze unknown substances with higher accuracy. For example, Patent Document 1 describes an analysis device that analyzes target substances containing a mixture of inorganic and organic substances using diffraction X-rays and fluorescent X-rays for inorganic substances and FT-IR, fluorescence analysis or Raman analysis for organic substances.

In particular, the infrared analysis and the Raman analysis are powerful means for analyzing a molecular structure of an unknown organic substance because they both measure molecular vibrations within molecules. Furthermore, information obtained from the infrared analysis and information obtained from the Raman analysis are complementary, and by combining both analysis methods, it is possible to elucidate the molecular structure of the unknown organic substance in more detail and with higher precision.

Recently, analysis methods that combine a microscope for analysis of microscopic samples and microscopic regions have also become known.

Patent Document 2 describes an observation device that includes a microscope optical system and a spectroscopic part that obtains absorption spectra in the ultraviolet, visible or infrared regions and Raman spectra.

For example, an objective mirror is used as an objective optical element of a microscope optical system in an infrared light detection system, and an objective lens is used as an objective optical element of a microscope optical system in a Raman light detection system. Thus, generally, the objective optical elements used in the infrared light detection system and the Raman light detection system are different. Therefore, when switching between the infrared light detection system and the Raman light detection system, it is also necessary to switch the microscope optical system. That is, when switching between the infrared light detection system and the Raman light detection system, it is necessary to switch the objective optical element of the infrared light detection system and the objective optical element of the Raman light detection system at the same time.

However, when switching the microscope optical system, an optical axis center of the objective optical element of the infrared light detection system or the objective optical element of the Raman light detection system with respect to the sample shifts due to the optical configuration.

If the optical axis center of the objective optical element of the infrared light detection system or the objective optical element of the Raman light detection system with respect to the sample shifts, a deviation occurs between the Raman light measurement position and the infrared light measurement position. This deviation becomes more noticeable in a microscopic sample or a microscopic measurement region.

Therefore, in order to continuously measure the Raman light and the infrared light with one device, each time the two detection systems are switched, an operator is required to align the sample each time, which places a burden on the operator and increases a time required for analysis.

PRIOR ART DOCUMENT

Patent Document

Patent Document 1: JP-A 2001-13095
Patent Document 2: WO 2013/132734

SUMMARY OF THE INVENTION

Problem to be Solved by the Invention

Therefore, in the case where an optical axis center of an objective optical element of a Raman light detection system or an objective optical element of an infrared light detection system with respect to the sample shifts when switching between the Raman light detection system and the infrared light detection system in one device, there has been a need for a device that can quickly correct optical axis deviations and perform Raman spectroscopy analysis and infrared spectroscopy analysis without placing an excessive burden on an operator.

An object of the present invention is to provide a Raman-infrared spectroscopy analysis combination device that adjusts an optical axis center of a microscope optical system with respect to a sample so that analysis regions of Raman spectroscopy analysis and infrared spectroscopy analysis are quickly matched without placing an excessive burden on an operator even if a Raman light detection system and an infrared light detection system are continuously switched.

Further, an object of the present invention is to provide an analysis method using Raman spectroscopy and infrared spectroscopy that quickly matches the analysis regions of the Raman spectroscopy analysis and the infrared spectroscopy analysis by adjusting the optical axis center of the microscope optical system with respect to the sample.

Means for Solving the Problem

That is, the present invention provides a Raman-infrared spectroscopy analysis combination device comprising:
   a light source for infrared spectroscopy analysis and a light source for Raman spectroscopy analysis;
   a plate for fixing a sample;
   a stage on which the plate is placed;
   an objective optical element for making light from the light source for the Raman spectroscopy analysis incident on the sample to obtain Raman light;

an objective optical element for making light from the light source of the infrared spectroscopy analysis incident on the sample to obtain reflected infrared light;

a Raman light detection system having an optical imaging element for generating a visible image; and an infrared light detection system having an optical imaging element for generating a visible image, the Raman-infrared spectroscopy analysis combination device further comprising:

a driving unit for adjusting a positional relationship between a position of the plate and the objective optical elements for obtaining the Raman light and for obtaining the infrared light;

a switching unit that switches between the Raman light detection system and the infrared light detection system; and a control unit for controlling the driving unit, the switching unit and the optical imaging elements, wherein at least one of the plate and the stage is provided with a marker for adjusting the positional relationship, and wherein the control unit controls the driving unit so as to adjust the positional relationship between the position of the plate and the objective optical elements for obtaining the Raman light and for obtaining the infrared light based on a position of the marker on the visible images obtained by the Raman light detection system and the infrared light detection system.

Further, the present invention provides a measurement method using infrared spectroscopy and Raman spectroscopy comprising:

irradiating a sample with light;

confirming a marker attached to at least one of a plate on which the sample is fixed and a stage on which the plate is placed on a visible image when detecting Raman light and infrared light from the sample;

confirming a deviation of the marker; and adjusting a positional relationship between a position of the plate and objective optical elements for obtaining the Raman light for Raman light detection and for obtaining the infrared light for infrared light detection when the marker is misaligned.

Effects of the Invention

According to the present invention, there is provided a Raman-infrared spectroscopy analysis combination device that adjusts an optical axis center of a microscope optical system with respect to a sample so that analysis regions of Raman spectroscopy analysis and infrared spectroscopy analysis are quickly matched even if a Raman light detection system and an infrared light detection system are continuously switched.

Further, according to the present invention, there is provided an analysis method using Raman spectroscopy and infrared spectroscopy that quickly matches the analysis regions of the Raman spectroscopy analysis and the infrared spectroscopy analysis by adjusting the optical axis center of the microscope optical system with respect to the sample.

As a result of the present invention, there is no need for an operator to separately move or adjust the position of the sample, making it possible to seamlessly measure Raman light and infrared light.

MODE FOR CARRYING OUT THE INVENTION

Figure 1:
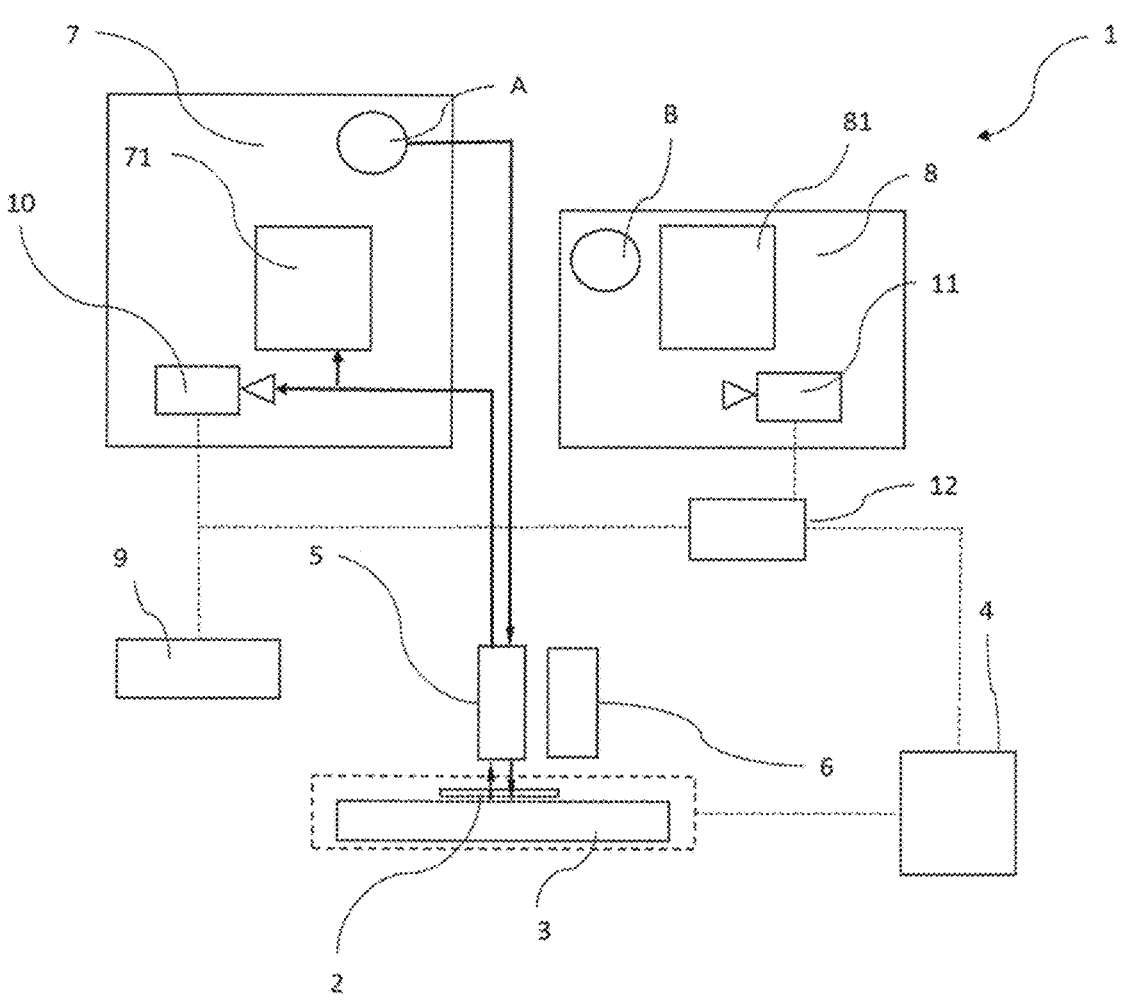
FIG. 1 is a schematic diagram showing one embodiment of a Raman-infrared spectroscopy analysis combination device of the present invention, showing a state in which it has been switched to a Raman light detection system.

Although the present invention will be described using FIGS. 1 and 2, the present invention is not limited to these figures. A Raman-infrared spectroscopy analysis combination device 1 of the present invention includes a Raman spectroscopy analysis light source A, a plate 2, a stage 3, a driving unit 4, an objective optical element 5, an objective optical element 6, a Raman light detection system 7 and an infrared light detection system 8, and the Raman light detection system 7 is provided with an optical imaging element 10 and the infrared light detection system 8 is provided with an infrared spectroscopy analysis light source B and an optical imaging element 11, respectively. A plate 2 is placed on the stage 3.

In FIG. 1, light emitted from the light source A reaches the objective optical element 5, which is a microscope optical system, through various optical elements (not shown). Note that in FIG. 1, arrows indicate the direction in which light travels.

The light emitted from the light source A used in Raman spectroscopy analysis is, for example, a laser beam in the visible or near-infrared region. For example, wavelengths from 405 nm as a short wavelength to 1064 nm as a long wavelength are used, and a combination of 532 nm and 785 nm is often used.

The light source B used in infrared spectroscopy analysis is infrared light emitted from a ceramic heater and has a wavelength of several μm to several tens of μm.

The objective optical element 5 has a configuration that combines a convex lens and a concave lens, and the light incident on the objective optical element 5 is focused by these lenses onto a sample to be measured (hereinafter also referred to as "sample") fixed to the plate 2. Raman light scattered by the sample is guided to the Raman light detection system 7 by various optical elements (not shown).

A part of the Raman light guided to the Raman light detection system 7 is guided to the optical imaging element

10 included in the Raman light detection system 7 by various optical elements (not shown). Further, the part of the Raman light guided to the Raman light detection system 7 is guided to the Raman spectrometer 71 by various optical elements (not shown).

Since the optical imaging element 10 generates a visible image of a region where the Raman light is scattered, it is possible to confirm a measurement region of the sample whose Raman light is being measured by the optical imaging element 10.

The optical imaging element 10 is, for example, a CCD (Charge Coupled Device) image sensor, a CMOS (Complementary Metal Oxide Semiconductor) image sensor and the like and is configured to be capable of capturing still images or moving images of the sample. The optical imaging element 10 can capture all or at least any of a bright field image, a dark field image, a phase contrast image, a fluorescence image, a polarized light microscope image or the like of the sample, depending on the configuration of the objective optical element 5 and transmitted illumination (not shown). The optical imaging element 10 outputs the captured image to a control unit 12 or other information processing device, which will be described later.

The Raman spectrometer 71 generates a one-dimensional or two-dimensional spectral image of Raman scattering light from the sample and obtains a Raman scattering spectrum (hereinafter also referred to as "Raman spectrum") from the one-dimensional or two-dimensional spectral image.

The Raman spectrometer 71 extracts a flat spectrum from the generated one-dimensional or two-dimensional spectral image in a region where the observation target does not exist and then can also obtain the Raman spectrum of the sample by taking a difference between the spectrum and a spectrum of each pixel. The Raman spectrum is typically a plot of an intensity of emitted light versus wavelength. The emitted light includes scattering light due to Raman scattering, and a wavelength shift (Raman shift) of the scattering light due to the Raman scattering differs depending on the molecular structure and the crystal structure of the sample.

The Raman spectrometer 71 outputs the obtained Raman spectrum to a monitor or the like (not shown) and stores it in a memory storage unit (not shown) if necessary.

In addition to the optical imaging element 10 and the Raman spectrometer 71, the Raman light detection system 7 may include an information processing device, a monitor, a memory storage unit and other necessary parts.

Figure 2:
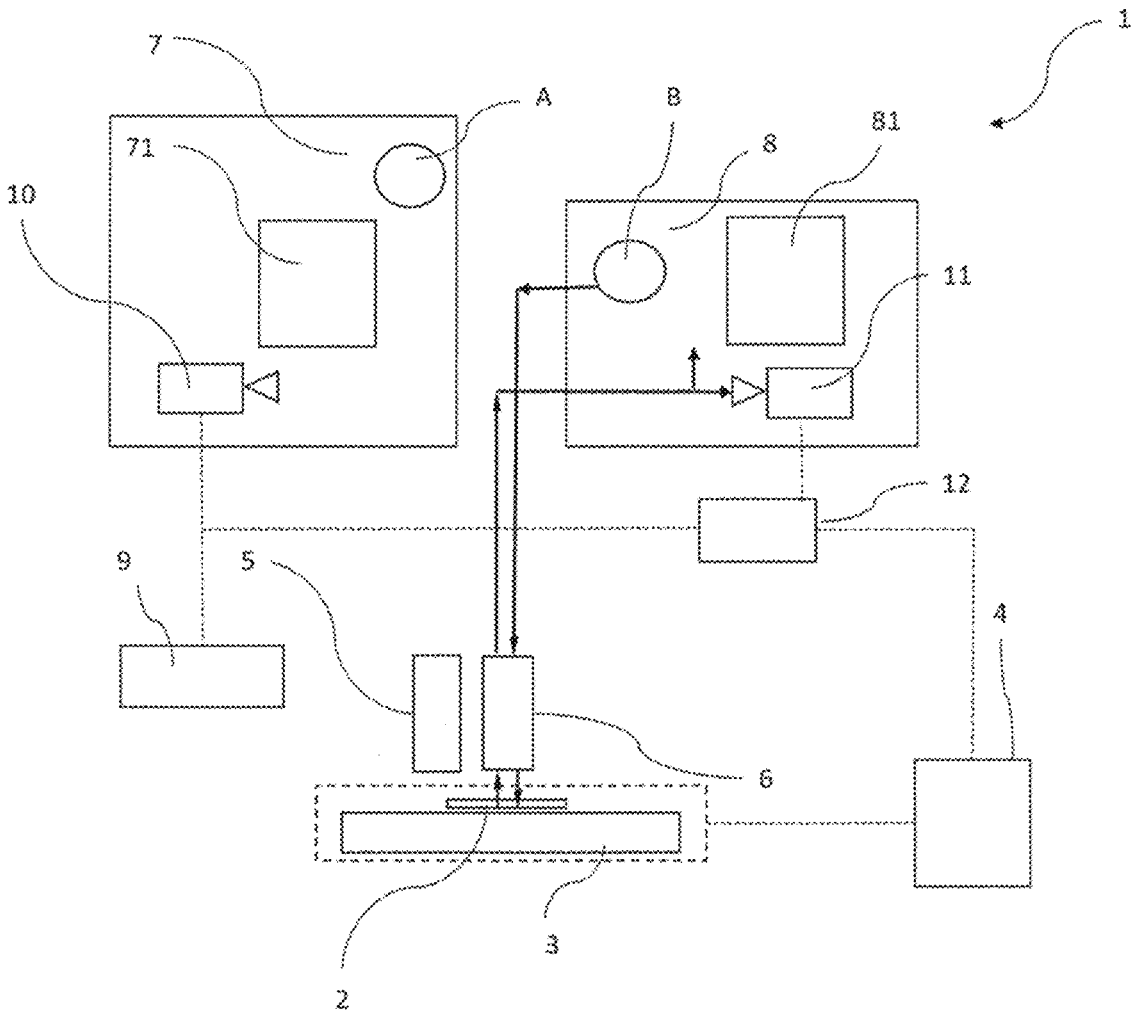
FIG. 2 is a schematic diagram showing the one embodiment of the Raman-infrared spectroscopy analysis combination device of the present invention, showing a state in which it has been switched to an infrared light detection system.

On the other hand, in FIG. 2, light emitted from the light source B installed in the infrared light detection system 8 is dispersed by various optical elements (not shown) by an infrared spectrometer (not shown) provided in an infrared spectrometer 81 included in the infrared light detection system 8 before being guided to the microscope optical system, and then reaches the objective optical element 6, which is the microscope optical system. Note that in FIG. 2, arrows indicate the direction in which light travels, similar to FIG. 1.

The light incident on the objective optical element 6 is focused on the sample fixed to the plate 2. The infrared light reflected by the sample is guided to the infrared light detection system 8 by various optical elements (not shown). From the viewpoint of measurement sensitivity, the objective optical element 6 is preferably a Cassegrain mirror that is a combination of a concave mirror and a convex mirror.

A part of the infrared light guided to the infrared light detection system 8 is guided to the optical imaging element 11 included in the infrared light detection system 8 by various optical elements (not shown). Further, the part of the infrared light guided to the infrared light detection system 8 is guided to the infrared spectrometer 81 by various optical elements (not shown) and then to an infrared detector (not shown).

Since the optical imaging element 11 generates a visible image of a region where the infrared light is reflected, it is possible to confirm a measurement region of the sample whose infrared light is being measured by the optical imaging element 11.

The optical imaging element 11 can have the same configuration as the optical imaging element 10 described above. The optical imaging element 11 can capture all or at least any of a bright field image, a dark field image, a phase contrast image, a fluorescence image, a polarized light microscope image or the like of the sample, depending on the configuration of transmission or reflection illumination (not shown), which is used depending on the objective optical element 5 and the properties of the sample. The optical imaging element 11 outputs the captured image to the control section 12 or other information processing device, which will be described later.

The infrared spectrometer 81 is preferably a Fourier transform infrared spectrometer. The spectrometer included in the infrared spectrometer 81 is preferably a Michelson interference spectrometer. The light reflected by the sample is guided to an infrared light detection system, and a part of the reflected light is guided to the optical imaging element 11 and another part of the reflected light is guided to the infrared spectrometer 81 again. A detector (not shown) is arranged in the infrared spectrometer 81, and the light guided to the infrared spectrometer 81 is guided to the detector by an optical element (not shown). This detector detects the infrared light.

In the case of the Fourier transform infrared spectrometer, a Fourier transform calculation means is connected to the detector. This Fourier transform calculation means performs a Fourier transform on the infrared light intensity detected by the detector to calculate an infrared spectrum. Further, this Fourier transform calculation means calculates the infrared spectrum of the sample, which is a difference between the respective infrared spectra of the sample and the background.

The infrared spectrometer 81 outputs the obtained Raman spectrum to a monitor or the like (not shown) and stores it in a memory storage unit (not shown) if necessary.

In addition to the optical imaging element 11 and the Raman spectrometer 81, the Raman light detection system 8 may include an information processing device, a monitor, a memory storage unit and other necessary parts.

The Raman-infrared spectroscopy analysis combination device 1 of the present invention switches between Raman spectrometry and infrared spectrometry using a switching mechanism 9 as necessary. Order of switching between the Raman spectrometry and the infrared spectrometry may be either from the Raman spectrometry to the infrared spectrometry or from the infrared spectrometry to the Raman spectrometry. Further, there is no particular limit to the number of times of switching, and the switching may be performed as many times as necessary.

In response to switching from the Raman spectrometry to the infrared spectrometry or from the infrared spectrometry to the Raman spectrometry by the switching mechanism, the driving unit 4 drives the plate 2 or the stage 3 to which the plate 2 is fixed and adjusts a positional relationships between the objective optical element 5 and the plate 2 and between the objective optical element 6 and the plate 2. Note that the driving unit 4 may also have a function of moving the plate in order to change the observation position in the Raman spectrometry and the infrared spectrometry.

When switching to the Raman spectrometry, the positional relationship between the objective optical element 5 and the plate 2 is adjusted so that the light focused by the objective optical element 5 is focused on a predetermined measurement region of the sample.

When switching to the infrared spectrometry, the positional relationship between the objective optical element 6 and the plate 2 is adjusted so that the light focused by the objective optical element 6 is focused on a predetermined measurement region of the sample.

Figure 3:
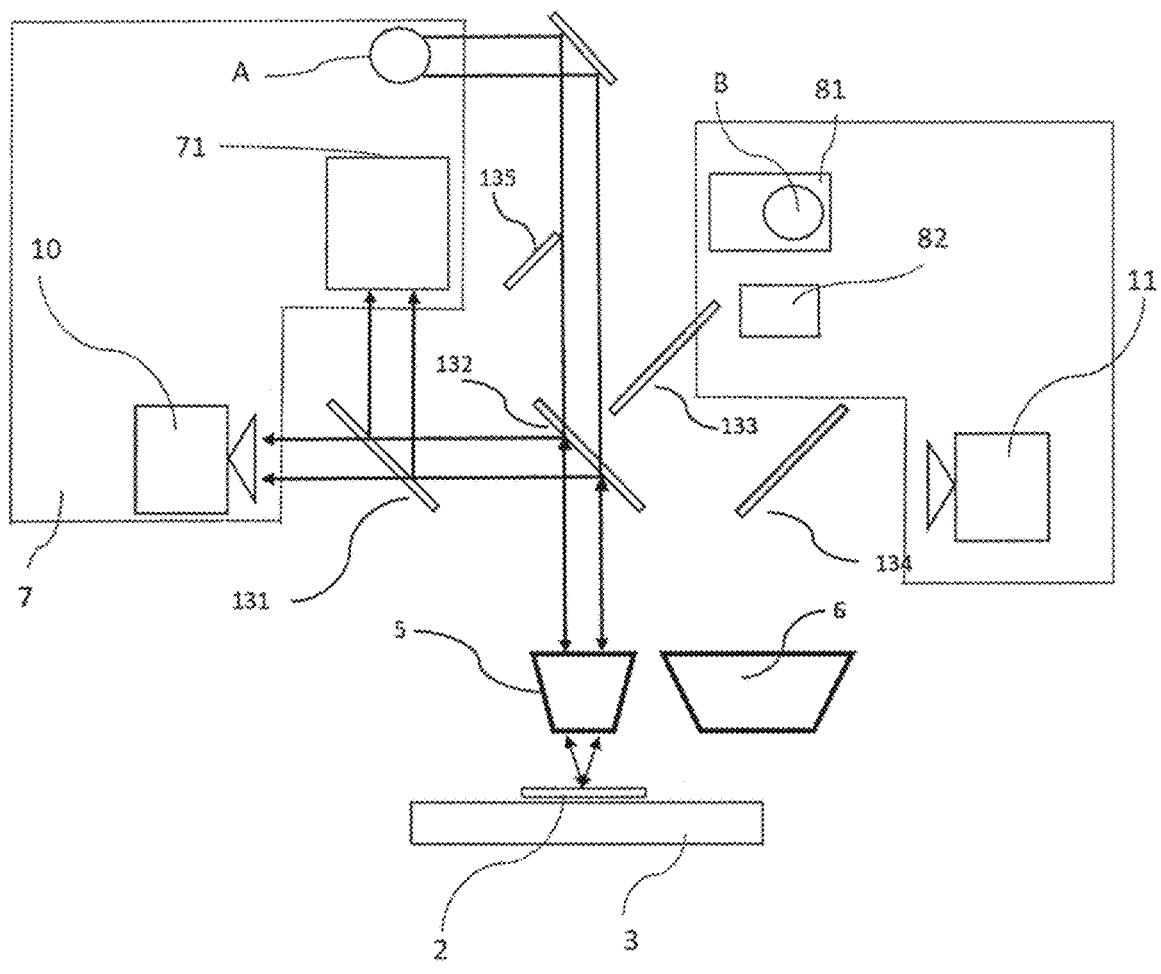
FIG. 3 is a schematic diagram showing another embodiment of the Raman-infrared spectroscopy analysis combination device of the present invention, showing a state in which a half mirror is used to switch to the Raman light detection system.
Figure 4:
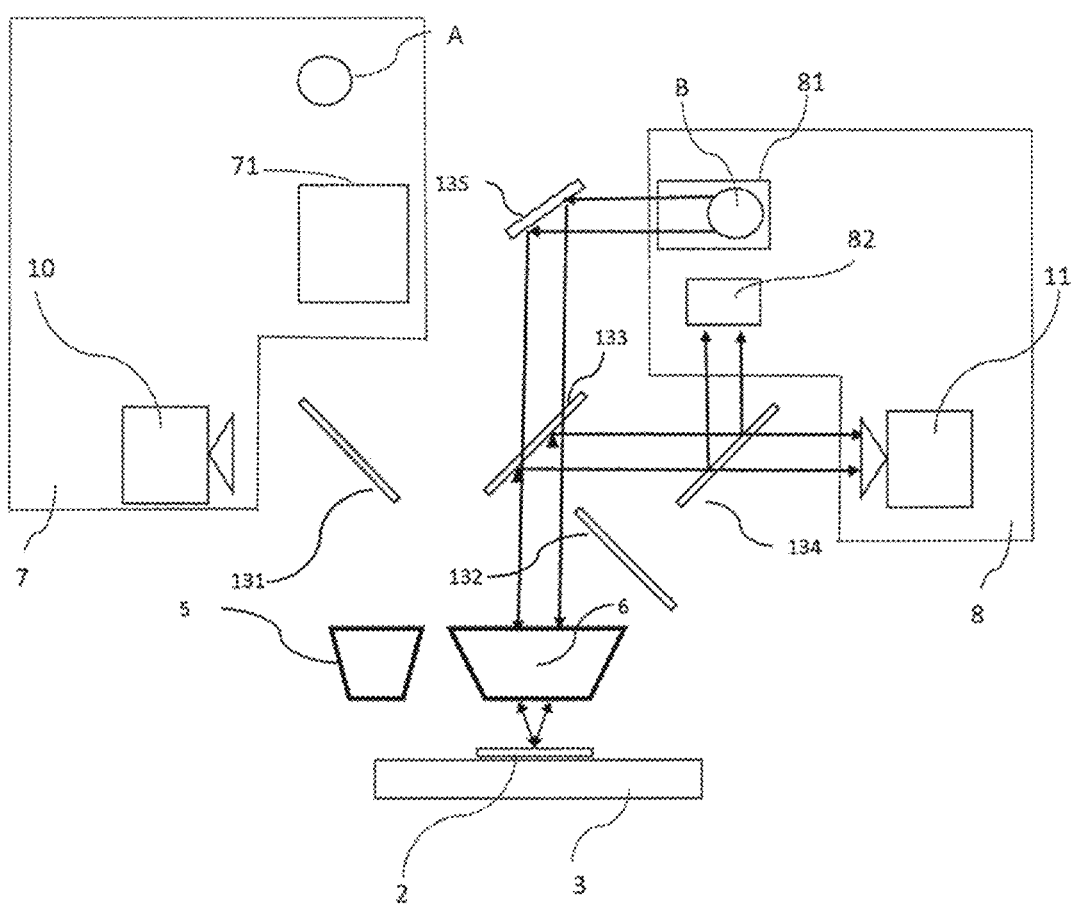
FIG. 4 is a schematic diagram showing another embodiment of the Raman-infrared spectroscopy analysis combination device of the present invention, showing a state in which the half mirror is used to switch to the infrared light detection system.

FIGS. 3 and 4 are schematic diagrams when switching between the Raman spectrometry and the infrared spectrometry is performed using optical elements 131 to 135. In this embodiment, the infrared light detection system 8 includes an infrared detector 82 in addition to the infrared spectrometer 81.

The infrared spectrometer 81 has a built-in light source B for infrared spectroscopy analysis separate from the light source for Raman spectroscopy analysis and has an infrared spectrometer (not shown). The infrared spectrometer included in the infrared spectrometer 81 is preferably a Michelson interferometer.

In FIG. 3, half mirrors are used as beam splitters for optical elements 131 and 132. The light emitted from the light source A is irradiated onto the sample through the objective optical element 5 using optical elements as appropriate, and a part of the scattered Raman light is guided to the optical imaging element 10 and another part is guided to the Raman spectrometer 71 by the half mirrors 132 and 131.

In FIG. 4, a reflecting mirror is used as the optical element 135, and the light emitted from the light source B, which is different from the one for Raman spectroscopy analysis built into the infrared spectrometer 81, is guided to the infrared spectrometer 81 and then is guided to the objective optical element 6. The light irradiated onto the sample through the objective optical element 6 passes through the objective optical element 6 again. And then, using half mirrors as beam splitters for the optical elements 133 and 134, a part of the light is guided to the optical imaging element 11 and another part of the light is guided to the infrared detector 82.

As described above, the Raman light detection system and the infrared light detection system obtain the Raman spectra and the infrared spectra, respectively.

In the switching mechanism in FIGS. 3 and 4, while the optical elements 131 to 135 are moved by the driving unit, the objective optical element 5, the objective optical element 6 and the stage 3 are driven so that the light that has passed through the objective optical element 5 or the objective optical element 6 is irradiated onto the sample.

The switching is not limited to those shown in FIGS. 3 and 4. For example, the light source, the optical element and the stage 3 may be driven, or switching may be performed using other methods.

As mentioned above, when switching between the Raman light detection system and the infrared light detection system, an optical axis center of the objective optical element of the Raman light detection system or the objective optical element of the infrared light detection system with respect to the sample may shift. Therefore, measurement positions or measurement regions of the sample may differ between the Raman spectroscopy analysis and infrared spectroscopy analysis.

In order to correct this deviation, in the Raman-infrared spectroscopy analysis combination device of the present invention, at least one of the plate 2 and the stage 3 is provided with a marker for adjusting the positional relationship between the objective optical element 5 and the plate 2 and between the objective optical element 6 and the plate 2.

This marker is visually recognized in the captured image by the optical imaging element 10 and the optical imaging element 11 that generate the visible images. Therefore, by comparing the positions of the respective markers in the visible images generated by the optical imaging element 10 and the optical imaging element 11, it is possible to confirm a degree of deviation of the optical axis centers of the objective optical element of the Raman light detection system and the objective optical element of the infrared light detection system with respect to the sample.

The positional relationships between the objective optical element 5 and the plate 2 and between the objective optical element 6 and the plate 2 are adjusted based on the deviation of this marker.

Examples of the marker include lines, points and combinations thereof, and various shapes such as circles, rectangles, triangles and crosses. It is sufficient that these markers are provided on at least one of the plate 2 and the stage 3, and it is preferable that the markers be provided on the stage 3 since it is not affected by the position of the plate.

Figure 5:
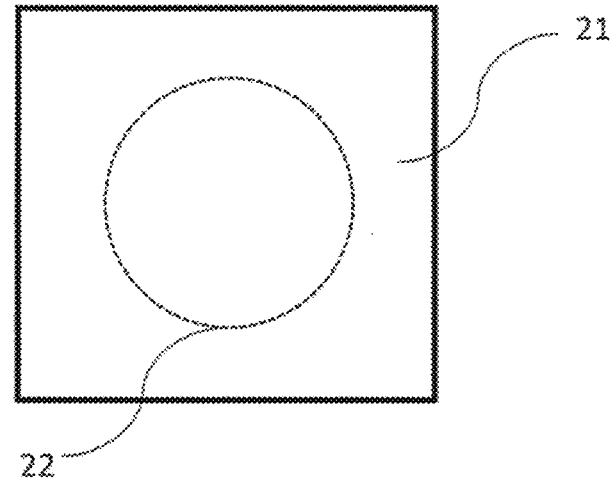
FIG. 5 is a schematic diagram when a circle as a marker is provided on a stage and the marker is visually recognized in a visible image generated by an optical imaging element of the Raman light detection system.
Figure 6:
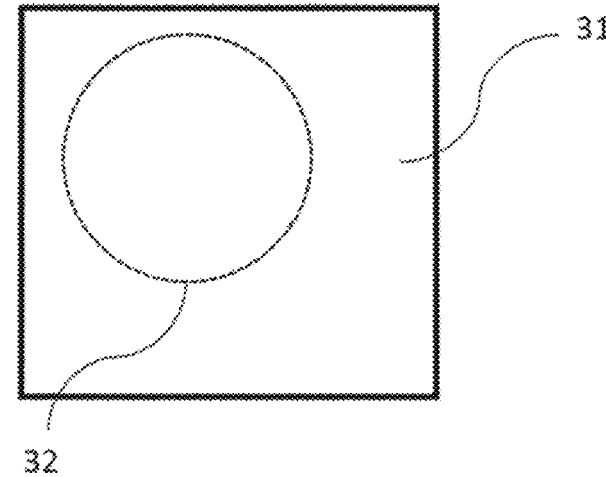
FIG. 6 is a schematic diagram when a circle as a marker is provided on a stage and the marker is visually recognized in a visible image generated by an optical imaging element of the infrared light detection system.

FIG. 5 is a schematic diagram when a circle as the marker is provided on the stage and the marker 22 is visually recognized in the visible image 21 generated by the optical imaging element 10. FIG. 6 is a schematic diagram when the marker 32 is visually recognized in the visible image 31 generated by the optical imaging element 11. By matching magnifications of the visible images 21 and 31, in the case where the optical axis of the objective optical element of the Raman light detection system or the objective optical element of the infrared light detection system is misaligned, the positions of the marker 22 in FIG. 5 and the marker 32 in FIG. 6 are shifted.

Figure 7:
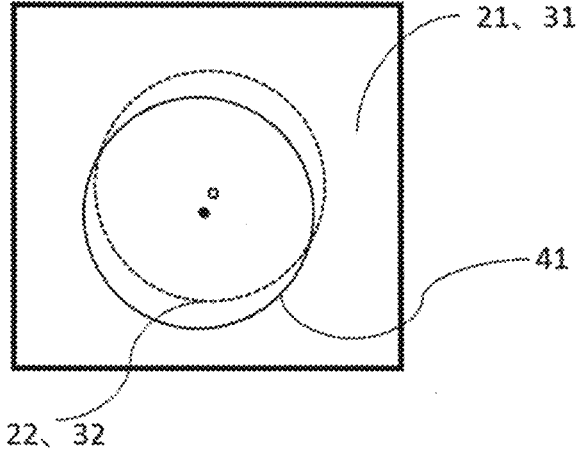
FIG. 7 is a schematic diagram in which marked lines are added to the visible images generated by the optical imaging elements.

The deviation between the markers 22 and 32 can be quantified by comparing the visible images 21 and 31. Further, when the optical imaging element 10 and the optical imaging element 11 generate the visible images, as schematically shown in FIG. 7, a marked line 41 may be provided on the visible image 21 and the visible image 31.

By providing the marked line on the visible image, the deviation of the marker can be quantified by comparing the positions of the markers 22 and 32 with the marked line. As schematically shown in FIG. 7, dots may be provided at the centers of the markers 22 and 32 while dots may also be provided at the center of the marked line 41, the distances between the dot positions may be shifted.

As a quantitative method, for example, the visible image may be divided into pixels, the position of each marker may be expressed in pixels, and the deviation between the two may be determined, or the deviation from the marker line may be expressed in pixels.

Based on the quantified deviation, the control unit 12 controls the driving unit 4 to adjust the positional relationships between the objective optical element 5 and the plate 2 and between the objective optical element 6 and the plate 2.

From the viewpoint of reducing the burden on the operator, it is preferable that the control section 12 has a storage unit, the storage unit stores the deviation between the marked line 41 and the markers 22 and 32 quantified by the above method, and each time the Raman light detection system and the infrared light detection system are switched, the driving unit 4 is controlled by the control unit 12 to adjust the positional relationships between the objective optical element 5 and the plate 2 and between the objective optical element 6 and the plate 2 based on the stored deviation in the storage unit.

Further, the present invention is an analysis method using infrared spectroscopy and Raman spectroscopy comprising: irradiating a sample with light; confirming a marker attached to at least one of a plate on which the sample is fixed and a stage on which the plate is placed on a visible image when detecting Raman light and infrared light from the sample; confirming a deviation of the marker; and adjusting a positional relationship between a position of the plate and objective optical elements for obtaining the Raman light for Raman light detection and for obtaining the infrared light for infrared light detection when the marker is misaligned.

The markers and the marker deviations are as described above. Alternatively, the deviation of the marker can be confirmed using the marked line and quantified in the same manner as described above.

The quantification of the deviation is as described above.

Based on the quantification of the deviation, the positional relationships between the objective optical element 5 and the plate 2 and between the objective optical element 6 and the plate 2 are adjusted, and Raman spectroscopy and infrared spectroscopy are measured. It is preferable to adjust the positional relationship by moving the stage on which the plate is placed.

The measurement method using the Raman spectroscopy and the infrared spectroscopy of the present invention can be performed using the Raman-infrared spectroscopy analysis combination device.

[Aspect]

It will be appreciated by those skilled in the art that the exemplary embodiments described above are specific examples of the following aspects.

[1] A Raman-infrared spectroscopy analysis combination device comprising:

a light source for infrared spectroscopy analysis and a light source for Raman spectroscopy analysis;

a plate for fixing a sample;

a stage on which the plate is placed;

an objective optical element for making light from the light source for the Raman spectroscopy analysis incident on the sample to obtain Raman light;

an objective optical element for making light from the light source of the infrared spectroscopy analysis incident on the sample to obtain reflected infrared light;

a Raman light detection system having an optical imaging element for generating a visible image; and an infrared light detection system having an optical imaging element for generating a visible image, the Raman-infrared spectroscopy analysis combination device further comprising:

a driving unit for adjusting a positional relationship between a position of the plate and the objective optical elements for obtaining the Raman light and for obtaining the infrared light;

a switching unit that switches between the Raman light detection system and the infrared light detection system; and a control unit for controlling the driving unit, the switching unit and the optical imaging elements, wherein at least one of the plate and the stage is provided with a marker for adjusting the positional relationship, and wherein the control unit controls the driving unit so as to adjust the positional relationship between the position of the plate and the objective optical elements for obtaining the Raman light and for obtaining the infrared light based on a position of the marker on the visible images obtained by the Raman light detection system and the infrared light detection system.

According to the invention according to the item [1], there is provided the Raman-infrared spectroscopy analysis combination device that adjusts an optical axis center of a microscope optical system with respect to a sample so that analysis regions of Raman spectroscopy analysis and infrared spectroscopy analysis are quickly matched even if the Raman light detection system and the infrared light detection system are continuously switched.

[2] The Raman-infrared spectroscopy analysis combination device according to the item [1], wherein the switching unit switches between the objective optical element for obtaining the Raman light and the objective optical element for obtaining the infrared light in response to switching between the Raman light detection system and the infrared light detection system.

[3] The Raman-infrared spectroscopy analysis combination device according to the item [1] or [2], wherein the visible image of the Raman light detection system and the visible image of the infrared light detection system each have a marked line.

[4] The Raman-infrared spectroscopy analysis combination device according to the item [3], wherein the control unit has a storage unit, wherein the storage unit stores an amount of a deviation between marker positions on the visible image of the Raman light detection system and the visible image of the infrared light detection system, and the marked lines of the visible image of the Raman light detection system and the visible image of the infrared light detection system when switching between the Raman light detection system and the infrared light detection system, and wherein each time the Raman light detection system and the infrared light detection system are switched, the control unit adjusts the positional relationship between the position of the plate and the objective optical element for obtaining the Raman light or the objective optical element for obtaining the infrared light based on the amount of the deviation stored in the storage unit.

[5] The Raman-infrared spectroscopy analysis combination device according to the item [4], wherein the amount of the deviation is the amount of deviation of pixels on the visible image.

[6] The Raman-infrared spectroscopy analysis combination device according to any one of the items [1] to [5], wherein the driving unit drives the stage to adjust the positional relationship between the position of the plate and the objective optical elements for obtaining the Raman light and for obtaining the infrared light.

[7] The Raman-infrared spectroscopy analysis combination device according to any one of the items [1] to [6], wherein the marker is provided on the stage.

[8] The Raman-infrared spectroscopy analysis combination device according to any one of the items [1] to [7], wherein the objective optical element for obtaining the infrared light is a Cassegrain mirror.

[9] The Raman-infrared spectroscopy analysis combination device according to any one of the items [1] to [8], wherein the light source for Raman spectroscopy analysis emits light of 532 nm and 785 nm.

[10] The Raman-infrared spectroscopy analysis combination device according to the item [1] or [8], wherein the marker is detachably provided on the plate or the stage.

11

According to the inventions according to the items [2] to [10], there is provided the Raman-infrared spectroscopy analysis combination device that adjusts an optical axis center of a microscope optical system with respect to a sample so that the optical axis center of the microscope optical system relative to the sample can be adjusted more quickly and the burden on the operator is further reduced even if the Raman light detection system and the infrared light detection system are continuously switched.

Further, the present invention is:

[11] A measurement method using infrared spectroscopy and Raman spectroscopy comprising:

irradiating a sample with light;

confirming a marker attached to at least one of a plate on which the sample is fixed and a stage on which the plate is placed on a visible image when detecting Raman light and infrared light from the sample;

confirming a deviation of the marker; and adjusting a positional relationship between a position of the plate and objective optical elements for obtaining the Raman light for Raman light detection and for obtaining the infrared light for infrared light detection when the marker is misaligned.

According to the invention according to the item [11], there is provided the analysis method using Raman spectroscopy and infrared spectroscopy that quickly matches the analysis regions of the Raman spectroscopy analysis and the infrared spectroscopy analysis by adjusting the optical axis center of the microscope optical system with respect to the sample.

[12] The measurement method according to the item [11], wherein the deviation of the marker is confirmed by a deviation between the marker and a marked line provided on the visible image.

[13] The measurement method according to the item [11] or [12], wherein the stage is moved to adjust the positional relationship with the objective optical element for obtaining the Raman light for the Raman light detection and the objective optical element for obtaining the infrared light for the infrared light detection.

According to the invention according to the items [12] and [13], there is provided the analysis method using Raman spectroscopy and infrared spectroscopy in which the optical axis center of the microscope optical system relative to the sample can be adjusted more quickly and the analysis regions for the Raman spectroscopy and the infrared spectroscopy can be easily matched.

DESCRIPTION OF REFERENCES

1: Raman-infrared spectroscopy analysis combination device
2: Plate
3: Stage
4: Driving unit
5: Objective optical element
6: Objective optical element
7: Raman light detection system
71: Raman spectrometer
8: Infrared light detection system
81: Infrared spectrometer
82: Infrared detector
9: Switching mechanism
10, 11: Optical imaging element
12: Control unit
131 to 135: Optical element
21, 22: Visible image

12

31, 32: Marker
41: Marked line
A: Raman spectroscopy analysis light source
B: Infrared spectroscopy analysis light source

What is claimed is:

1. A Raman-infrared spectroscopy analysis combination device comprising:

a light source for infrared spectroscopy analysis and a light source for Raman spectroscopy analysis;

a plate for fixing a sample;

a stage on which the plate is placed;

an objective optical element for making light from the light source for the Raman spectroscopy analysis incident on the sample to obtain Raman light;

an objective optical element for making light from the light source of the infrared spectroscopy analysis incident on the sample to obtain reflected infrared light;

a Raman light detection system having an optical imaging element for generating a visible image; and an infrared light detection system having an optical imaging element for generating a visible image, the Raman-infrared spectroscopy analysis combination device further comprising:

a driving unit for adjusting a positional relationship between a position of the plate and the objective optical elements for obtaining the Raman light and for obtaining the infrared light;

a switching unit that switches between the Raman light detection system and the infrared light detection system; and a control unit for controlling the driving unit, the switching unit and the optical imaging elements, wherein at least one of the plate and the stage is provided with a marker for adjusting the positional relationship, and wherein the control unit controls the driving unit so as to adjust the positional relationship between the position of the plate and the objective optical elements for obtaining the Raman light and for obtaining the infrared light based on a position of the marker on the visible images obtained by the Raman light detection system and the infrared light detection system.

2. The Raman-infrared spectroscopy analysis combination device as claimed in claim 1, wherein the switching unit switches between the objective optical element for obtaining the Raman light and the objective optical element for obtaining the infrared light in response to switching between the Raman light detection system and the infrared light detection system.

3. The Raman-infrared spectroscopy analysis combination device as claimed in claim 1, wherein the visible image of the Raman light detection system and the visible image of the infrared light detection system each have a marked line.

4. The Raman-infrared spectroscopy analysis combination device as claimed in claim 3, wherein the control unit has a storage unit, wherein the storage unit stores an amount of a deviation between marker positions on the visible image of the Raman light detection system and the visible image of the infrared light detection system, and the marked lines of the visible image of the Raman light detection system and the visible image of the infrared light detection system when switching between the Raman light detection system and the infrared light detection system, and wherein each time the Raman light detection system and the infrared light detection system are switched, the control unit adjusts the positional relationship between the position of the plate and the objective optical element for obtaining the Raman light or the objective optical element for obtaining the infrared light based on the amount of the deviation stored in the storage unit.

5. The Raman-infrared spectroscopy analysis combination device as claimed in claim 4, wherein the amount of the deviation is the amount of deviation of pixels on the visible image.

6. The Raman-infrared spectroscopy analysis combination device as claimed in claim 1, wherein the driving unit drives the stage to adjust the positional relationship between the position of the plate and the objective optical elements for obtaining the Raman light and for obtaining the infrared light.

7. The Raman-infrared spectroscopy analysis combination device as claimed in claim 1, wherein the marker is provided on the stage.

8. The Raman-infrared spectroscopy analysis combination device as claimed in claim 1, wherein the objective optical element for obtaining the infrared light is a Cassegrain mirror.

9. The Raman-infrared spectroscopy analysis combination device as claimed in claim 1, wherein the light source for Raman spectroscopy analysis emits light of 532 nm and 785 nm.

10. The Raman-infrared spectroscopy analysis combination device as claimed in claim 1, wherein the marker is detachably provided on the plate or the stage.

11. A measurement method using infrared spectroscopy and Raman spectroscopy comprising:

irradiating a sample with light;

confirming a marker attached to at least one of a plate on which the sample is fixed and a stage on which the plate is placed on a visible image when detecting Raman light and infrared light from the sample;

confirming a deviation of the marker; and adjusting a positional relationship between a position of the plate and objective optical elements for obtaining the Raman light for Raman light detection and for obtaining the infrared light for infrared light detection when the marker is misaligned.

12. The measurement method as claimed in claim 11, wherein the deviation of the marker is confirmed by a deviation between the marker and a marked line provided on the visible image.

13. The measurement method as claimed in claim 11, wherein the stage is moved to adjust the positional relationship with the objective optical element for obtaining the Raman light for the Raman light detection and the objective optical element for obtaining the infrared light for the infrared light detection.

* * * * *